United States Patent
Chou et al.

[19]

[11] Patent Number: 6,104,146

[45] Date of Patent: Aug. 15, 2000

[54] BALANCED POWER SUPPLY CIRCUIT FOR MULTIPLE COLD-CATHODE FLUORESCENT LAMPS

[75] Inventors: John Chou, Monterey Park; Yung-Lin Lin, Palo Alto, both of Calif.

[73] Assignee: Micro International Limited, Grand Cayman, Cayman Islands

[21] Appl. No.: 09/250,779

[22] Filed: Feb. 12, 1999

[51] Int. Cl.[7] .................................................. H05B 41/16
[52] U.S. Cl. ........................... 315/277; 315/224; 315/291
[58] Field of Search ................... 315/278, 277, 315/276, DIG. 4, 224, 291, 307, 306, 220

[56] References Cited

U.S. PATENT DOCUMENTS

| | | | |
|---|---|---|---|
| 5,287,040 | 2/1994 | Lestician | 315/324 |
| 5,420,779 | 5/1995 | Payne | 363/56 |
| 5,430,641 | 7/1995 | Kates | 363/133 |
| 5,615,093 | 3/1997 | Nalbant | 263/25 |
| 5,619,402 | 4/1997 | Liu | 363/20 |
| 5,818,172 | 10/1998 | Lee | 315/86 |

*Primary Examiner*—Don Wong
*Assistant Examiner*—Ephrem Alemu
*Attorney, Agent, or Firm*—Hayes, Soloway, Hennessey, Grossman & Hage, P.C.

[57] ABSTRACT

The present invention provides a CCFL driving circuit having a parallel-arranged transformer system and a feedback loop positioned to sense the current in one of the lamps in the system. Each CCFL in the system is driven by the secondary side an individual transformer. Based on the current sensed in the feedback loop, a controller supplies the appropriate driving voltage to the primary side of the transformers, which in turn powers each CCFL. Since the primary sides of the transformers are arranged in parallel, and since each CCFL is connected at a common node, it is ensured that each transformer receives identical voltage, and the current in each CCFL loop is balanced.

16 Claims, 3 Drawing Sheets

BALANCED POWER SUPPLY CIRCUIT FOR MULTIPLE COLD-CATHODE FLUORESCENT LAMPS

BACKGROUND OF THE INVENTION

1. Field of the Invention

The present invention relates to a power supply for a cold-cathode fluorescent lamp (CCFL) system. More particularly, the present invention relates to a power supply topology that delivers evenly-distributed current to each CCFL in a multiple CCFL system. The present invention has particular utility in applications which utilize CCFL technology, for example, display systems found in portable computers, instrumentation, etc.; although other utilities are contemplated herein.

2. Description of Related Art

FIG. 1 depicts a conventional CCFL power supply system 10. The system broadly includes a power supply 12, a CCFL driving circuit 16, a controller 14, a feedback loop 18, and one or more lamps CCFL1, CCFL2. Power supply 12 supplies a DC voltage to circuit 16, and is controlled by controller 14, through transistor Q1. Circuit 16 is a self-resonating circuit, known as a Royer circuit. Essentially, circuit 16 is a self-oscillating dc to ac converter, whose resonant frequency is set by L1 and C1, and N1–N4 designate transformer windings and number of turns of the windings. In operation, transistors Q2 and Q3 alternately conduct and switch the input voltage across windings N1 and N2, respectively. If Q2 is conducting, the input voltage is placed across winding N1. Voltages with corresponding polarity will be placed across the other windings. The induced voltage in N4 makes the base of Q2 positive, and Q2 conducts with very little voltage drop between the collector and emitter. The induced voltage at N4 also holds Q3 at cutoff. Q2 conducts until the flux in the core of T1 reaches saturation.

Upon saturation, the collector of Q2 rises rapidly (to a value determined by the base circuit), and the induced voltages in the transformer decrease rapidly. Q2 is pulled further out of saturation, and $V_{CE}$ rises, causing the voltage across N1 to further decrease. The loss in base drive causes Q2 to turn off, which in turn causes the flux in the core to fall back slightly and induces a current in N4 to turn on Q3. The induced voltage in N4 keeps Q3 conducting in saturation until the core saturates in the opposite direction, and a similar reversed operation takes place to complete the switching cycle.

Although the inverter circuit 16 is composed of relatively few components, its proper operation depends on complex interactions of nonlinearities of the transistors and the transformer. In addition, due to variations in C1, Q2 and Q3 (typically, a 35% tolerance between components of this type) circuit 16 is not easily adapted for parallel transformer arrangements, since any duplication of the circuit 16 will produce additional, undesirable operating frequencies which may resonate at certain harmonics. This effect produces a "beat" in the CCFLs, which is a noticeable, and undesirable effect. Even if the tolerances are closely matched, because circuit 16 operates in self-resonant mode, the undesirable beat effects cannot be removed as any duplication of the circuit will have its own unique operating frequency.

In the arrangement shown in FIG. 1, power is supplied to the lamps, CCFL1 and CCFL2, by transformer T1. Each lamp in the system is connected in parallel, and driven by the impedance of Co1 and Co2, respectively. Ideally, Co1 and Co2 are identical so that current is evenly divided between CCFL1 and CCFL2, although, as will be described more fully below, variations within each CCFL can greatly influence the current drawn along each loop. Feedback circuit 18 includes sense resistor $R_S$, which provides feed back to the controller 14, which in turn, regulates the power input into circuit 16 (via Q1). Importantly, in the topology shown in FIG. 1, only the output current $I_{OUT}$ is sensed by $R_S$. Also, as noted above, circuit 16 is not very well adapted to a multiple configuration, thus only one power supply transformer (T1) exists for both lamps, or for that matter, any number of lamps. Thus, the system 10 of FIG. 1 is incapable of determining if any unbalanced condition exists in any individual CCFL loop, since only the output current is sensed. Moreover, any unbalanced impedance along the two loops (Co1, CCFL1 and Co2, CCFL2, respectively) creates unbalanced current through each CCFL, which significantly degrades the expected life of the lamps and the system overall.

Similar CCFL driving systems can be found in U.S. Pat. No. 5,615,093 issued to Nablant; U.S. Pat. No. 5,430,641 issued to Kates; U.S. Pat. No. 5,619,402 issued to Liu; U.S. Pat. No. 5,818,172 issued to Lee; and U.S. Pat. No. 5,420,779 issued to Payne. Each are incorporated herein by reference as disclosing circuit topologies of a type similar to that shown in FIG. 1. Each of these references suffer from similar and/or additional drawbacks as discussed above in reference to the system 10 shown in FIG. 1.

Thus, there exists a need to overcome the aforementioned drawbacks of conventional driving circuits and provide a driving circuit for multiple CCFL systems that overcomes the provides feedback control of each individual lamp in the system, thereby permitting a balanced current state to exist in all lamps in the system, which significantly increases the overall life expectancy of each lamp and the system overall. Moreover, there exists a need to provide a CCFL driving circuit that is relatively simple to implement, and does not suffer from the aforementioned drawbacks when applied to a multiple CCFL system.

SUMMARY OF THE INVENTION

Accordingly, the present invention provides an optimized system for evenly distributing current through each CCFL in a multiple CCFL system, thereby improving the reliability of the system.

Broadly defined, the present invention provides a CCFL system comprising a parallel-arranged transformer system driving circuit and a feedback loop positioned to sense the current in one of the lamps in the system. Each CCFL in the system is driven by the secondary side of an individual transformer. Based on the current sensed in the feedback loop, a controller supplies the appropriate driving voltage to the primary side of the transformers, which in turn powers each CCFL. Since the primary sides of the transformers are arranged in parallel, and since each CCFL is connected at a common node, it is ensured that each transformer receives identical voltage, and the current in each CCFL loop is balanced.

In the preferred embodiment, a CCFL driving circuit is provided. Included in the preferred embodiment is a transformer comprising a plurality of primary windings and secondary winding, where each of the primary windings are arranged in parallel and coupled to a voltage source. Each of the secondary winding are coupled to a CCFL (cold cathode fluorescent lamp) circuit. At least one of the CCFL circuits includes a sense impedance for sensing the current flowing through that CCFL circuit. A controller is provided for regulating the voltage source based at least in part on the current flowing through said sense impedance.

Advantageously, the system of the present invention provides a relatively simple architecture that permits multiple CCFL circuits to be driven in both steady-state and start-up mode with balanced (i.e., approximately equal) current flowing through each CCFL in the system.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF PREFERRED EMBODIMENTS

Figure 2:
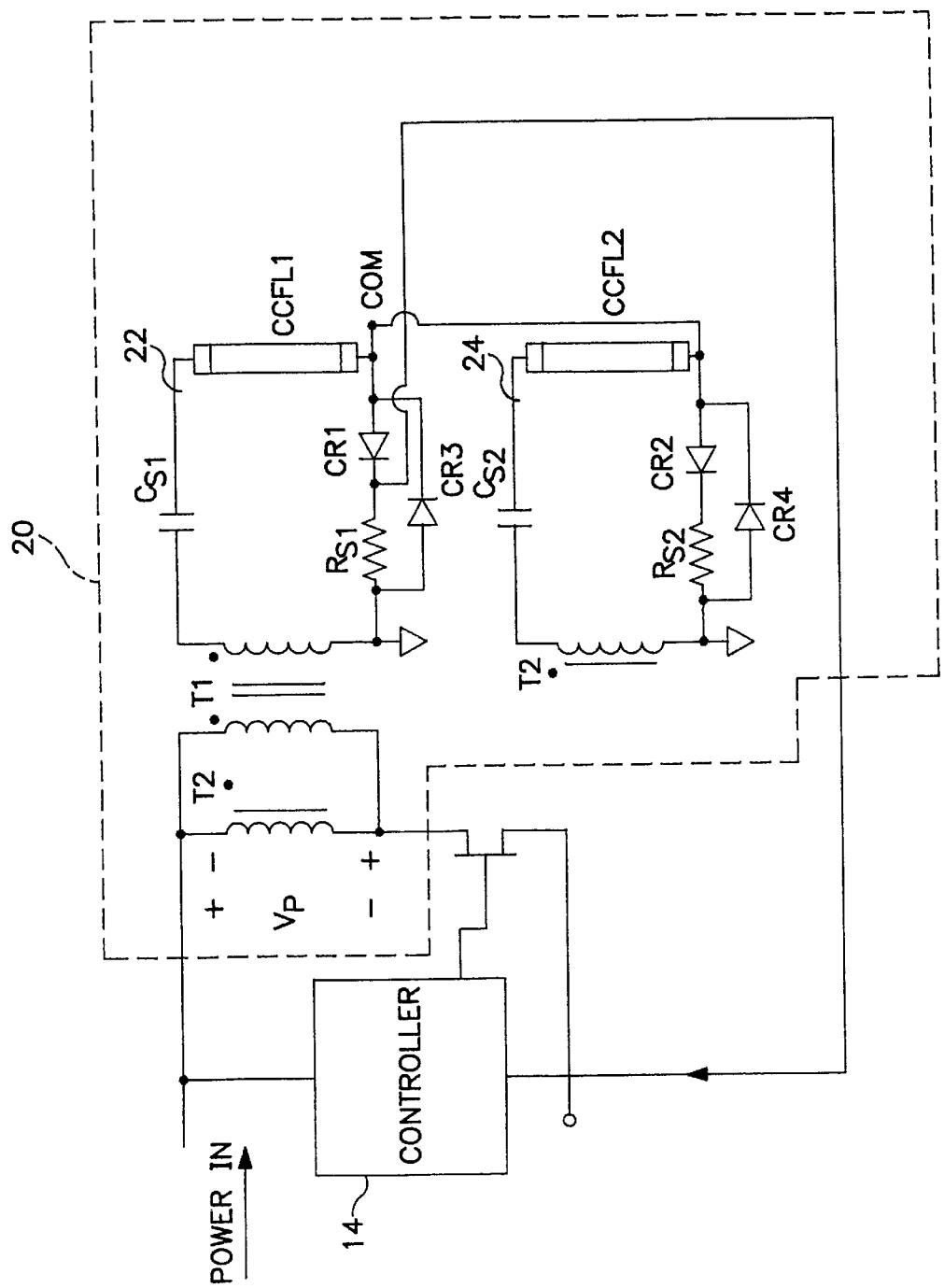
FIG. 2 is a circuit diagram of a CCFL driving system of the present invention.

Turning to FIG. 2, a CCFL driving system 20 of the present invention is depicted. The system 20 generally includes a parallel transformer T1, T2, a feedback controller 14, input voltage (Power In), and one ore more CCFL loops 22, 24. Each of these functional components are described more fully below.

Transformers T1 and T2 have their windings connected in parallel. The primary side voltage, $V_p$, can be derived from various methods, so long as the source satisfies Faraday's Law. For example, the source $V_p$ can be obtained through a push-pull circuit, a forward circuit, a half bridge circuit, a full bridge circuit, a flyback circuit, etc., and/or other known circuit topologies suitable to drive a transformer. The secondary side of each transformer drives each CCFL loop. Preferably, T1 and T2 have identical transformer properties.

Controller 14 regulates the amount of voltage and power $V_p$ delivered to the primary windings, which, in turn regulates the amount of power in each CCFL, using feedback from sense resistor $R_{S1}$. Preferably, controller 14 is a pulse-width modulator (PWM) circuit, as is known in the art. Alternatively, controller 14 can be a pulse-frequency modulator (PFM) circuit, or other known controlling circuits suitable to control $V_p$. Since the primary windings of T1 and T2 are arranged in parallel and each CCFL circuit 22, 24 are coupled together at COM, the current flowing through CCFL2 follows. Preferably, $C_{S1}=C_{S2}$, $R_{S1}=R_{S2}$, in addition to the equivalence of CCFL1 and CCFL2, thereby assuring that each CCFL loop 22, 24 has approximately equal impedance.

Figure 1:
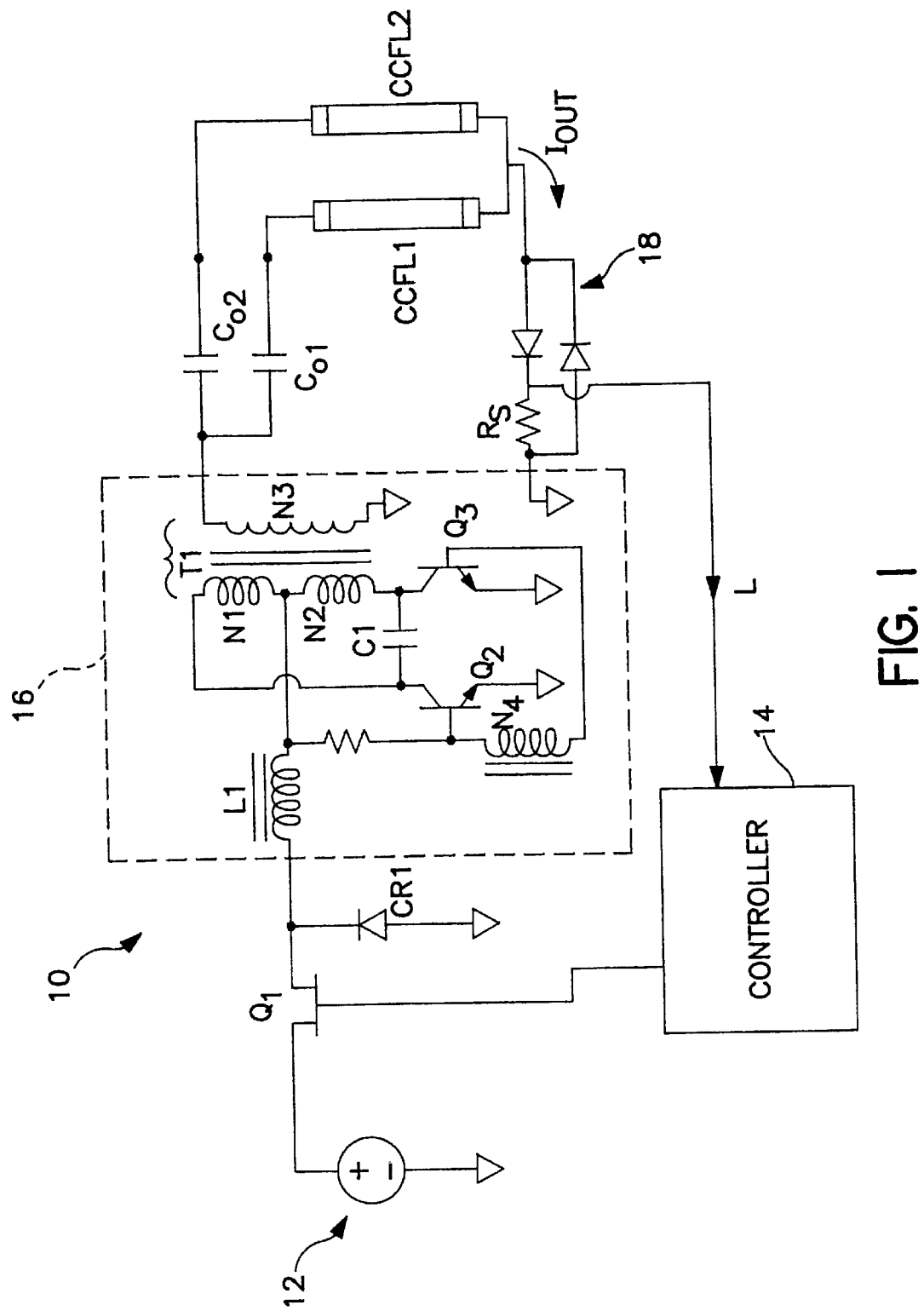
FIG. 1 is a circuit diagram of a CCFL driving system of the prior art.

While not wishing to be bound by example, the advantages of the circuit shown in FIG. 2 over the circuit shown in FIG. 1 are set forth below.

Steady-State of a CCFL

It will be noted by those skilled in the art that a typical CCFL requires roughly 600 Volts AC to maintain a steady state. Assuming that each that the desired steady state current draw for each CCFL is 5 mA. Thus, the controller 14 will regulate the power to ensure 10 mA. is provided (assuming a two-CCFL system). In FIG. 1, the worst case is that one CCFL conducts and carries the entire 10 mA., while the other fails to conduct and carries 0 mA. In FIG. 1, the controller is satisfied because sense resistor $R_S$ reads that 10 mA. is flowing, which, in total, is correct. However, the conducting CCFL in this scenario is overstressed by a factor of two. Thus, the life expectancy of that CCFL is significantly degraded. On the other hand, in the circuit shown in FIG. 2, the controller reads the current sensed through $R_{S1}$. Thus, assuming the above-noted parameters, the maximum allowable current in loop 22 is 5 mA., which controller 14 can regulate based on feedback through $R_{S1}$. Thus, the current through each loop is forced to be equal.

Ignition of a CCFL

It will be noted by those skilled in the art that a typical CCFL requires approximately 1500 Volts AC to strike an arc in the CCFL for ignition. In FIG. 1, assume that CCFL1 takes 10 ms to ignite, and CCFL2 requires 1 sec to ignite, due to variations of the lamp parameters. Such lamp parameters can change due to, for example, relative age of each lamp, manufacturing technique for each lamp, manufacturing tolerances associated with each lamp, etc. Assume also that controller 14 regulates power within 10 ms, and is designed to supply 10 mA. When the circuit is energized, CCFL1 will ignite and conduct 10 mA. before CCFL2 has ignited, while controller is regulating the current as "normal", since 10 mA. is seen at $R_S$. Thus, CCFL2 fails to ignite and CCFL1 is, like the example above, overstressed by a factor of two.

Assuming the same exemplary parameters as above, in the present invention shown in FIG. 2, controller 14 will supply the appropriate ignition voltage for 10 ms, as required by sense resistor $R_{S1}$ for CCFL1. After 20 ms., when CCFL1 ignites and conducts 5 mA, since CCFL1 and CCFL2 are connected to a common node COM, 2.5 mA will be diverted to CCFL2, i.e. evenly into the two paths defined by CR1, $R_{S1}$, CR2 and $R_{S2}$. Therefore, since CCFL2 has not ignited yet, the controller continues to drive $V_p$ and the secondary side of transformer T2 with a higher ignition voltage until CCFL2 ignites successfully (i.e., after 1 sec.), since the voltage on the secondary side of a transformer is much higher when there is no load connected.

Figure 3:
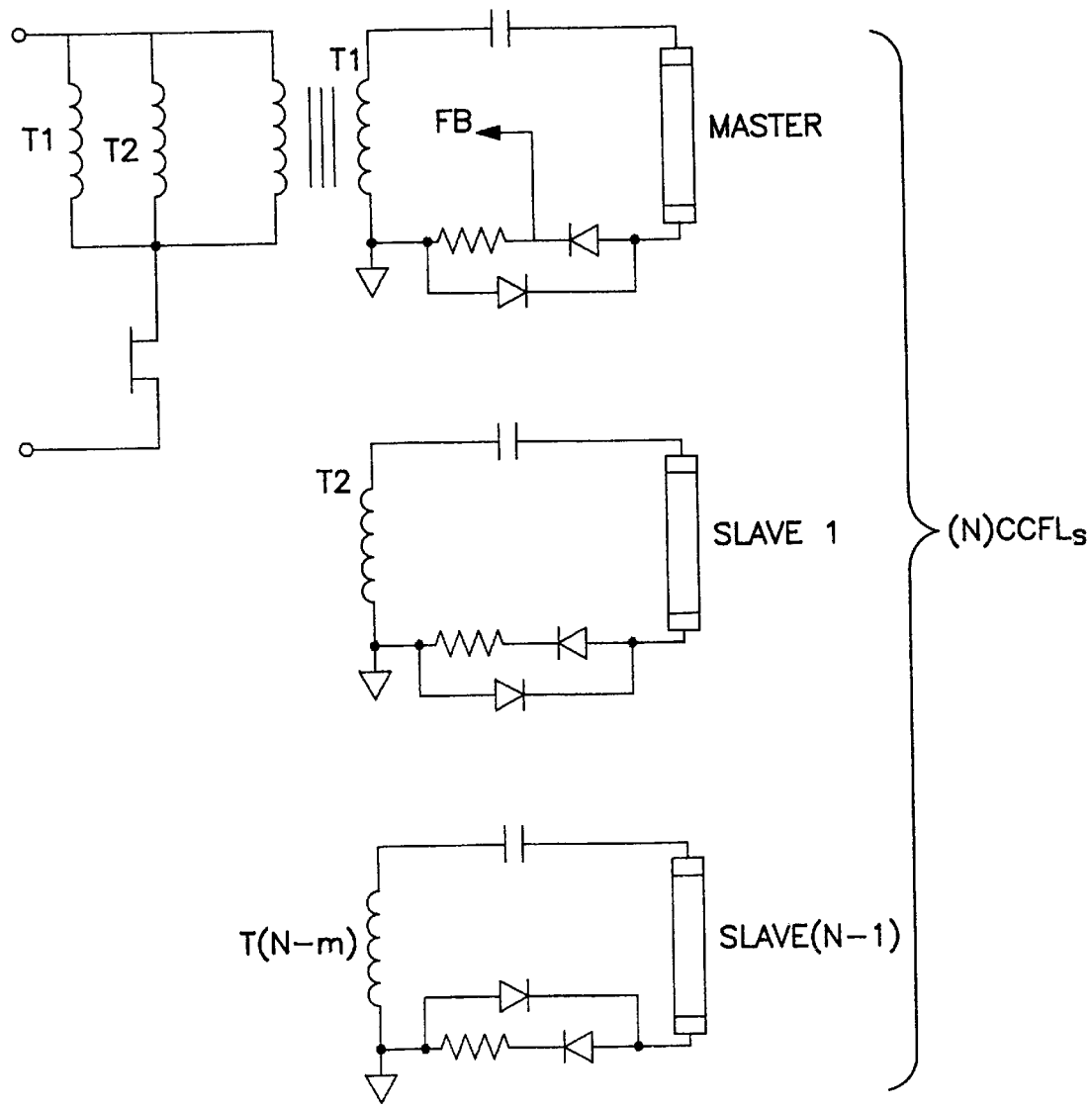
FIG. 3 is a circuit diagram of a CCFL driving system of the present invention configured for n CCFL devices.

In yet another example, and turning to FIG. 3, a system 30 with more than two CCFLs is depicted. In some instances, it is desirable to provide a multi-lamp CCFL system, especially where lighting and contrast requirements are critical. In the present invention shown in FIG. 3, the topology herein described can be extended to multi-lamp environments. In an N lamp system, there are respective N primary side windings, T1, T2, ..., $T_N$. Accordingly, N CCFL loops are provided: Master, Slave 1, ..., Slave (N−1). The system 30 of FIG. 3 operates in a similar manner as described above with reference to FIG. 2, however, controller (not shown) will be appropriately adapted to deliver the amount of current based on the number of CCFL loops in the system. It should be noted that since each transformer shown in FIGS. 2 and 3 are arranged for parallel operation, only one operating frequency exists in the system (i.e. $F_{T1}=F_{T2}=F_{Tn}$). Since the circuit shown in FIG. 1 is designed to be self-oscillating, if the circuit shown in FIG. 1 is adapted for a multiple stage CCFL environment, as shown in FIG. 3, multiple power stages would be necessary to correct for, or at least limit, the multiple operating frequencies that would exist. Thus, significant cost savings is achieved in the present invention over prior art techniques.

It should also be noted that the transformer T1 shown in FIG. 1 is a single transformer, while the transformers T1, T2, . . . , Tn, are each individual transformers. Although the overall size of the each transformer in FIGS. 2 and 3 may slightly exceed that of the transformer shown in FIG. 1, there are significant temperature advantages in using separate transformers as opposed to a single transformer, since each separate transformer carries a smaller current load. Thus, a temperature decrease, and thus, system reliability increase, is achieved in the embodiments shown in FIGS. 2 and 3.

Thus, it is evident that there has been provided a CCFL driving circuit that provides balanced current to each CCFL in the system. Modifications to the present invention are possible. For example, controller 14 can be appropriately modified with a programmable circuit to compare the sensed current through $R_{S1}$ with a preset value. In addition, controller 14 can be appropriately modified with a current limiting circuit or turn-off switch that will turn of power supplied to the loops if the current exceeds a predetermined threshhold.

Still other modifications are possible. For example, although the present invention shown in FIGS. 2 and 3 depicts feedback coming from the first CCFL in the system, those skilled in the art will recognize that the feedback can be placed on any CCFL loop in the system, since the transformers are arranged in parallel, and each CCFL loop is connected at a common node.

Other alterations, modifications, and/or alternative applications will be apparent to those skilled in the art. Accordingly, the following claims are intended as encompassing all such alterations, modifications, and/or alternative applications as may fall within the spirit and scope of the present invention, defined by the claims as set forth below.

What is claimed is:

1. A CCFL driving circuit comprising a transformer comprising a plurality of primary windings and secondary windings, each said primary windings being coupled directly in parallel with one another and coupled to a voltage source, each of said secondary windings being coupled to a CCFL (cold cathode fluorescent lamp) circuit, each said CCFL circuit coupled together at a common node, a single feedback signal for sensing the current flowing through a selected one of said CCFL circuits, and a controller for regulating said voltage source based at least in part on said current flowing through said selected one CCFL circuit.

2. A CCFL driving circuit as claimed in claim 1, wherein said voltage source being supplied by a circuit selected from the group consisting of a push/pull circuit, a forward circuit, a half bridge circuit, a full bridge circuit, or a flyback circuit.

3. A CCFL driving circuit as claimed in claim 1, wherein said voltage source being supplied from a circuit satisfying Faraday's Law.

4. A CCFL driving circuit as claimed in claim 1, wherein each of said CCFL circuit including a cold cathode fluorescent lamp, a capacitor and said sense impedance arranged in series.

5. A CCFL driving circuit as claimed in claim 1, wherein said controller including a pulse-width modulation (PWM) circuit for regulating said voltage source.

6. A CCFL driving circuit as claimed in claim 5, wherein said PWM further including a comparator for comparing said current flowing through said at least one CCFL circuit to a predetermined value and regulating said voltage source based on the difference thereof.

7. A CCFL driving circuit as claimed in claim 1, wherein said controller including a pulse-frequency modulation (PFM) circuit for regulating said voltage source.

8. A CCFL driving circuit as claimed in claim 7, wherein said PFM further including a comparator for comparing said current flowing through said at least one CCFL circuit to a predetermined value and regulating said voltage source based on the difference thereof.

9. A CCFL driving circuit as claimed in claim 1, wherein said controller further including a switch circuit to turn off said voltage source if said current flowing through said at least one CCFL circuit is above a predetermined value.

10. A CCFL driving circuit as claimed in claim 1, wherein said sense impedance comprising a sense resistor having a voltage drop in response said current flowing through said at least one CCFL circuit.

11. A CCFL driving circuit as claimed in claim 1, wherein each of said CCFL circuit being coupled together in parallel and connected at a common node.

12. A CCFL driving circuit as claimed in claim 1, wherein each of said CCFL circuit comprising a single CCFL.

13. A method of delivering power to a cold cathode fluorescent lamp (CCFL), said method comprising the steps of:

driving a plurality of primary windings coupled directly in parallel with one another with a power source;

driving a plurality of respective secondary windings connected to a plurality of respective CCFL circuits;

coupling each said CCFL circuits together at a common node;

providing a single feedback signal from a selected one of said plurality of CCFL circuits for determining a current flowing through said selected CCFL;

regulating said power source at least in part by the value of said current flowing through said CCFL.

14. A method as claimed in claim 13, further comprising the step of comparing said current flowing through said CCFL to a predetermined value and regulating said power source based thereon.

15. A method as claimed in claim 13, wherein said power source providing a sufficient voltage to ignite each said lamp, and a lower voltage to sustain operation of said lamp.

16. A method as claimed in claim 13, further comprising the step of regulating said power supply so as to turn off said power supply if said current flowing through said CCFL is above a predetermined value.

* * * * *

UNITED STATES PATENT AND TRADEMARK OFFICE
CERTIFICATE OF CORRECTION

PATENT NO. : 6,104,146
DATED : AUGUST 15, 2000
INVENTOR(S) : CHOU ET AL.

It is certified that error appears in the above-identified patent and that said Letters Patent are hereby corrected as shown below:

On the title page, please delete the Assignee and insert therefor: --O2 Micro International Limited--; and in the Abstract, second sentence, insert --of-- after "side".

Signed and Sealed this

Twenty-fourth Day of April, 2001

Attest:

NICHOLAS P. GODICI

Attesting Officer     Acting Director of the United States Patent and Trademark Office